UNITED STATES PATENT OFFICE.

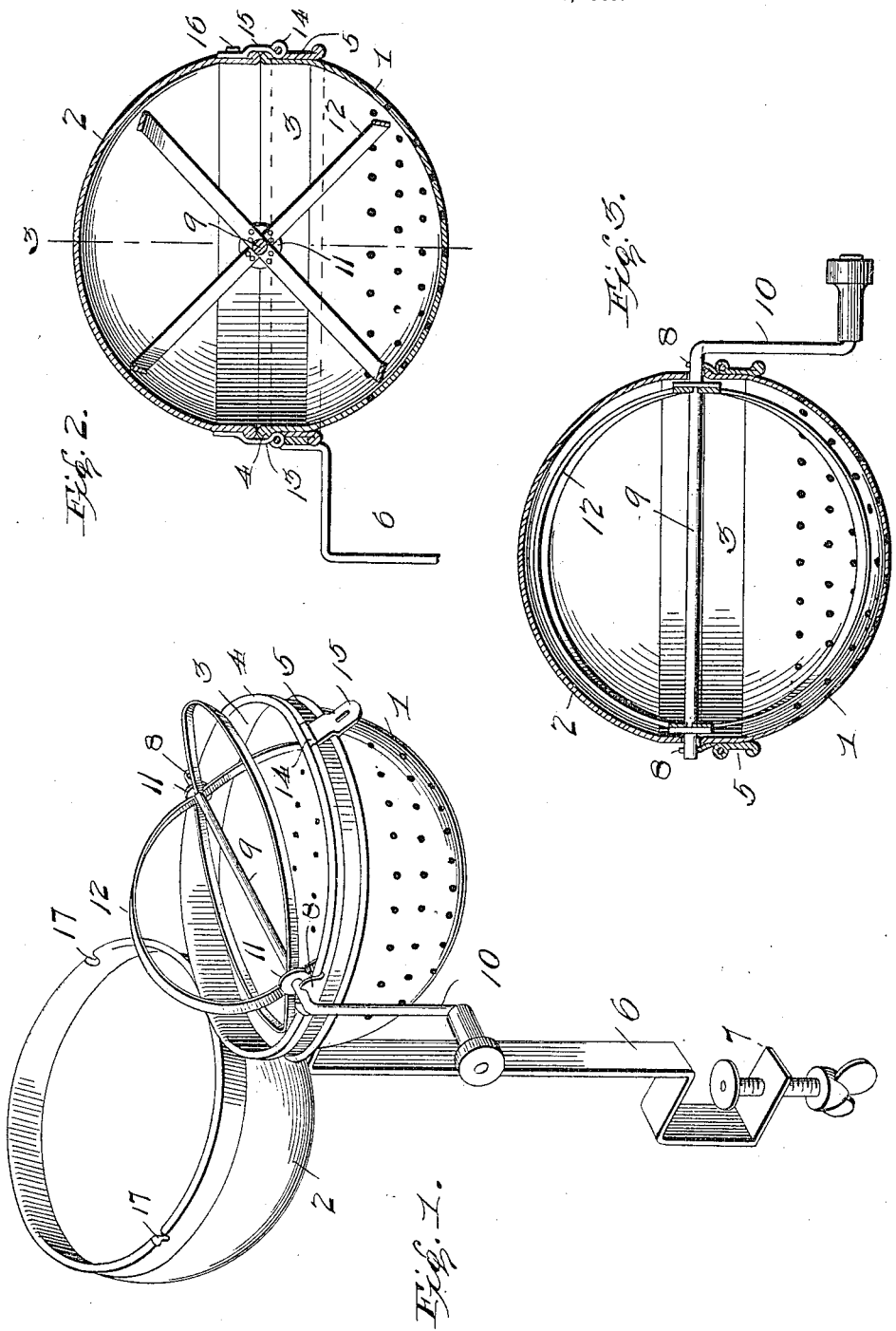

JOSIE NORRIS, OF MARYVILLE, MISSOURI.

COLANDER.

No. 831,566.  Specification of Letters Patent.  Patented Sept. 25, 1906.

Application filed June 7, 1905. Serial No. 264,125.

*To all whom it may concern:*

Be it known that I, JOSIE NORRIS, a citizen of the United States, residing at Maryville, in the county of Nodaway and State of Missouri, have invented certain new and useful Improvements in Colanders, of which the following is a specification.

This invention relates to culinary utensils of the type commonly known as "colanders," usually employed in the kitchen for sifting and straining purposes generally.

To this end the invention has in view a simple and practical construction of colander which may be conveniently supported for use in any desirable position on a shelf, table, or other support and embodying simple and practical means for effecting a thorough straining or sifting action of any material or food article placed therein for straining or sifting purposes. In this connection the invention has in view a construction wherein screens or strainers of different mesh may be interchangeably employed in connection with the same cover or lid, thus greatly increasing the range of use of the utensil.

A further object of the invention is to utilize the cover or lid as a fastening or holding means for the working parts of the colander and also to provide a combined beater and scraper so constructed as to operate as an agitator and presser device for sifting or straining the material and also as a scraper for loosening up and scraping the material from the inner wall of the strainer-bowl of the utensil.

With these and other objects in view, which will more readily appear as the nature of the invention is better understood, the same consists in the novel construction, combination, and arrangement of parts, which will be hereinafter more fully described, illustrated, and claimed.

The essential features of the invention involved in carrying out the objects above indicated are necessarily susceptible to structural change without departing from the scope of the invention; but a preferred embodiment thereof is shown in the accompanying drawings, in which—

Figure 1 is a perspective view of a colander constructed in accordance with this invention and showing the lid unfastened and thrown open. Fig. 2 is a sectional view of the colander with the cover or lid closed and fastened down upon the strainer-bowl. Fig. 3 is a sectional view of the same construction on the line 3 3 of Fig. 2.

Like reference-numerals designate corresponding parts in the several figures of the drawings.

The colander proper essentially consists in its general organization of a hollow spherical body comprising the separate semispherical members 1 and 2, respectively, which when in matching relation constitute the complete body, while at the same time subserving, respectively, the functions of a strainer-bowl and a cover therefor.

The semispherical member which constitutes the strainer-bowl of the colander is formed of any suitable foraminous material, such as wire fabric or perforated sheet metal, but is preferably provided at the upper edge thereof with a supporting rim or band 3, which constitutes a reinforce for the open side of the bowl and also a supporting element coöperating with the holder for the colander parts. Said supporting rim or band 3 is preferably provided at its edge with a flange or bead 4, adapted to engage the upper edge of a holder-ring 5, which constitutes the holding member for the colander. The holder-ring 5 preferably consists of a flat metal band within which snugly and detachably registers the flat supporting rim or band 3 of the strainer-bowl 1, so that when the strainer-bowl is placed within the socket provided by the ring 5 and pressed into the position shown in the several figures of the drawings said bowl is firmly held in place while at the same time capable of being readily removed, so that it may be replaced by similar bowls having screen or strainer surfaces of different mesh though of the same size. Thus different bowls may be interchangeably placed within the holder-ring 5. The latter is rigidly secured to the standard member of a supporting-bracket 6, carrying a screw or quivalent clamp 7 at one end, whereby the bracket may be secured to the edge of a table, shelf, or other convenient point of support where it may be desired to use the colander.

The detachable and replaceable bowl 1 is provided at its upper edge with the diametrically opposite open bearings 8, receiving the spindle-extremities of the beater-axle 9. At one end the beater-axle is bent in the form of an exterior operating-crank 10, and inside of the plane of the bearings 8 is preferably provided with the supporting-collars 11, to which are suitably fastened the extremities of a plurality of combined beater and scraper blades 12. The combined beater and scraper blades 12 are preferably arranged in regularly-spaced order and are of a bowed or arched form to conform to the spherical shape of the colander-body.

The blades 12 are constructed of metal strips set obliquely, so that when the beater is rotated in one direction the blades act as pressers to forcibly strain the material through the bowl, while, on the other hand, when the beater is rotated in the opposite direction said beaters will act in the capacity of scrapers for scraping the material from the inner surface of the bowl.

The cover or lid is preferably imperforate throughout and is adapted to be closed on to the upper edge of the bowl 1. It is preferable in carrying out the invention to provide at one side of the cover or lid a direct hinge connection 13 between said cover and the holder-ring 5 and at a point opposite the said hinge connection to mount on the said holder-ring, as at 14, a fastening-latch 15, having a detachable catch connection 16 with the cover 2 when the latter is closed. This construction provides for a firm battening down of the strainer-bowl, while at the same time not interfering with the ready removal and replacing thereof. The said cover 2 is provided in its edge at opposite points with open bearing-notches 17, which complete the bearing-support for the beater-axle 9.

From the foregoing it is thought that the construction, operation, and many advantages of the herein-described colander will be readily apparent without further description, and it will be understood that changes in the form, proportion, and minor details of construction may be resorted to without departing from the scope of the invention or sacrificing any of the advantages thereof.

Having thus described the invention, what is claimed, and desired to be secured by Letters Patent, is—

A colander comprising a bracket provided with a holder-ring, a perforate strainer-bowl detachably inserted within the ring and having a flange or bead bearing thereon, an imperforate hemispherical cover arranged to bear on the upper edge of the bowl, a hinged connection between said cover and the holder-ring, and a latch connection between said cover and the holder-ring, and a combined beater and scraper operating within the bowl and its cover.

In testimony whereof I affix my signature in presence of two witnesses.

JOSIE NORRIS.

Witnesses:
 IRA K. ALDERMAN,
 GEORGE W. PARTRIDGE.